United States Patent Office 3,314,992
Patented Apr. 18, 1967

3,314,992
1-(p-SEMICARBAZONOMETHYL-BENZYL)-2-METHYL-HYDRAZINE SALTS
Ado Kaiser, Neu-Frenkendorf, and Paul Zeller, Allschwil, Switzerland, assignors to Hoffmann-La Roche Inc., Nutley, N.J., a corporation of New Jersey
No Drawing. Filed Feb. 10, 1966, Ser. No. 526,370
Claims priority, application Switzerland, Mar. 5, 1965, 3,128/65
3 Claims. (Cl. 260—554)

The present invention is concerned with novel substituted hydrazine compounds of the formula

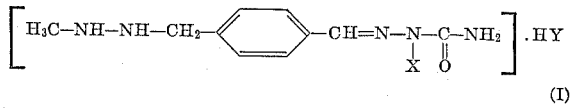

(I)

in which X is hydrogen or lower alkyl, and Y is the cation of an inorganic or organic acid.

The lower alkyl group denoted by X can contain up to 7 carbon atoms. X preferably represents the methyl group. HY preferably represents an inorganic acid, particularly a hydrohalic acid, such as hydrochloric or hydrobromic acid. Other inorganic acids are represented by sulfuric acid and phosphoric acid. Also organic acids may be denoted by HY, for example tartaric acid, citric acid, oxalic acid, camphor-sulfonic acid, salicylic acid, ascorbic acid, maleic acid, mandelic acid and the like.

Preferred representatives of compounds of Formula I are, for example, 1-(p-semicarbazono-methyl-benzyl)-2-methyl-hydrazine hydrohalide, 1-[p-(2-methylsemicarbazono)-methyl-benzyl]-2-methyl-hydrazine hydrohalide.

The compounds of Formula I can be manufactured by reacting, under acidic conditions, 1-(p-formylbenzyl)-2-methyl-hydrazine or an acid addition salt of this compound with a semicarbazide of the formula

(II)

in which X has the significance given above, or with an acid addition salt of the compound of Formula II.

The 1-(p-formylbenzyl)-2-methyl-hydrazine, or a salt of this compound, employed as starting material can be prepared as follows:

1,4-bis-chloromethyl-benzene is reacted with 1,2-diacetyl - 2 - methyl-hydrazine-sodium. The 1,2-diacetyl-1-(p-chloromethyl-benzyl)-2-methyl-hydrazine formed is converted according to a Sommelet reaction into the corresponding benzaldehyde. The protecting groups can be split off by means known per se (e.g. hydrolysis).

For the reaction of 1-(p-formylbenzyl)-2-methyl-hydrazine with a semicarbazide of Formula II, it is convenient to employ a salt of at least one of these compounds. Advantageously, the hydrochlorides of both reaction partners are reacted in the presence of a lower alkanol (e.g. in the presence of methanol). The reaction is promoted by being conducted under acidic conditions, e.g. the presence of an acidic agent; for example, of an inorganic acid such as a hydrohalic acid (especially aqueous hydrochloric acid), of an organic acid such as aqueous oxalic acid or of an aromatic sulphonic acid such as toluene-sulphonic acid. The reaction is preferably carried out at elevated temperature (for example, at the boiling temperature of the alkanol used), expediently in an inert atmosphere (e.g. in a nitrogen atmosphere).

The salts of Formula I can be converted into other salts encompassed by the same Formula I. For example, non-pharmaceutically acceptable acid addition salts can be converted into pharmaceutically acceptable acid addition salts by neutralization followed by reaction with a suitable medicinally acceptable acid.

The hydrazine compounds of Formula I are useful as cytostatic agents. Thus, they inhibit the growth of transplantable tumors, e.g. Walker carcinoma, in mice and rats. In particular, 1-(p-semicarbazono-methyl-benzyl)-2-methyl-hydrazine hydrochloride and 1-[p-(2-methylsemicarbazono) - methyl-benzyl]-2-methyl-hydrazine hydrochloride are especially active against the Walker carcinoma of rats.

The hydrazine compounds of Formula I are accordingly pharmaceutically useful; for example, they can be administered internally in the form of conventional pharmaceutical preparations which contain the active materials or their pharmaceutically acceptable acid addition salts in admixture with a pharmaceutical organic or inorganic inert carrier which is suitable for enteral or parenteral application such as, for example, water, gelatin, gum arabic, lactose, starch, magnesium stearate, talc, vegetable oils, polyalkyleneglycol, Vaseline, and the like. The pharmaceutical preparations can be submitted in solid form (e.g. as tablets, dragees, suppositories, capsules) or in liquid form (e.g. as solutions, suspensions or emulsions). They may be sterilized and/or contain additives such as preserving, stabilizing, wetting or emulsifying agents, salts for varying the osmotic pressure, or buffers. They can also contain other therapeutically active materials.

The following examples are illustrative of the invention but not limitative thereof. All temperatures are stated in degrees centigrade.

Example 1

A mixture of 8 g. of 1-(p-formylbenzyl)-2-methyl-hydrazine hydrochloride, 4.5 g. of semicarbazide hydrochloride, 40 ml. of methanol and 20 ml. of water is heated to boiling under reflux conditions in a nitrogen atmosphere for 30 minutes. The reaction solution is then cooled to −5°. The colourless, crystalline 1-(p-semicarbazono-methyl-benzyl)-2-methyl-hydrazine hydrochloride which precipitates melts at 205–212° with decomposition after recrystallization twice from methanol/water.

Example 2

When employing 2-methylsemicarbazide instead of semicarbazide, there is obtained in analogous manner corresponding to the procedure of Example 1, 1-[p-(2-methylsemicarbazono) - methyl - benzyl] - 2 - methyl-hydrazine hydrochloride, a crystalline, colourless compound which melts at 211–215° with decomposition after recrystallization from methanol/water.

The 1-(p-formylbenzyl)-2-methyl-hydrazine employed in Examples 1 and 2 as starting material can be prepared as follows:

175 g. of 1,4-bis-chloromethyl-benzene is reacted with 76 g. of 1,2-diacetyl-2-methyl-hydrazine-sodium. The so-obtained 1,2 - diacetyl-1-(p-chloromethyl - benzyl)-2-methyl-hydrazine is condensed with hexamethylene-tetramine. The adduct formed is split by a Sommelet reaction utilizing aqueous acetic acid. The 1,2-diacetyl-1-(p-formylbenzyl)-2-methyl-hydrazine obtained is then converted into 1-(p-formylbenzyl)-2-methyl-hydrazine hydrochloride by treatment with 2-N hydrochloric acid.

Example 3

Manufacture of capsules of the following composition:

| | Mg. |
|---|---|
| 1-[p-(2-methylsemicarbazono)-methyl-benzyl]-2-methyl-hydrazine hydrochloride | 25 |
| Mannitol | 90 |
| Talc | 5 |
| | 120 |

The active material is homogeneously mixed with the talc and the mannitol, passed through a No. 5 sieve nesh width about 0.23 mm.) and again blended. The obtained mixture is then filled into gelatin capsules o. 4.

We claim:
1. A compound of the formula

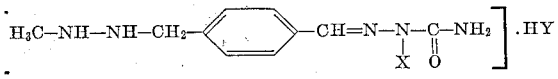

which X is hydrogen or lower alkyl and Y is the ition of an inorganic or organic acid.

2. A compound as in claim 1, which is 1-(p-semicarbazono-methyl-benzyl)-2-methyl-hydrazine hydrochloride.

3. A compound as in claim 1, which is 1-[p-(2-methyl-semicarbazono)-methyl-benzyl] - 2 - methyl - hydrazine hydrochloride.

No references cited.

ALEX MAZEL, *Primary Examiner.*
HENRY R. JILES, *Examiner.*

UNITED STATES PATENT OFFICE
CERTIFICATE OF CORRECTION

Patent No. 3,314,992                      April 18, 1967

Ado Kaiser et al.

It is certified that error appears in the above identified patent and that said Letters Patent are hereby corrected as shown below:

Column 1, lines 17 and 18, and column 3, line 10, "cation", each occurrence, should read -- anion --.

Signed and sealed this 2nd day of September 1969.

(SEAL)
Attest:

Edward M. Fletcher, Jr.             WILLIAM E. SCHUYLER, JR.
Attesting Officer                   Commissioner of Patents